US012480672B2

(12) United States Patent
Nawaz et al.

(10) Patent No.: US 12,480,672 B2
(45) Date of Patent: Nov. 25, 2025

(54) MULTI-FUNCTIONAL EQUIPMENT FOR DIRECT DECARBONIZATION WITH IMPROVED INDOOR AIR QUALITY

(71) Applicant: UT-Battelle, LLC, Oak Ridge, TN (US)

(72) Inventors: Kashif Nawaz, Oak Ridge, TN (US); Brian A. Fricke, Oak Ridge, TN (US); Xin Sun, Oak Ridge, TN (US); Scott Sluder, Oak Ridge, TN (US); Constantinos Tsouris, Oak Ridge, TN (US); Michelle K. Kidder, Oak Ridge, TN (US); Christopher J. Janke, Oak Ridge, TN (US); Kai Li, Oak Ridge, TN (US); Joshua A. Thompson, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 505 days.

(21) Appl. No.: 17/974,227

(22) Filed: Oct. 26, 2022

(65) Prior Publication Data
US 2023/0125924 A1   Apr. 27, 2023

Related U.S. Application Data

(60) Provisional application No. 63/272,351, filed on Oct. 27, 2021.

(51) Int. Cl.
*B01D 53/02* (2006.01)
*B01D 53/04* (2006.01)
(Continued)

(52) U.S. Cl.
CPC .............. *F24F 8/125* (2021.01); *B01D 53/02* (2013.01); *B01D 53/04* (2013.01); *B01D 53/06* (2013.01);
(Continued)

(58) Field of Classification Search
CPC ........ B01D 53/02; B01D 53/04; B01D 53/06; B01D 53/14
See application file for complete search history.

(56) References Cited

U.S. PATENT DOCUMENTS

5,022,970 A   6/1991   Cook et al.
6,364,938 B1  4/2002   Birbara et al.
(Continued)

*Primary Examiner* — Robert A Hopkins
(74) *Attorney, Agent, or Firm* — WARNER NORCROSS + JUDD LLP (57) ABSTRACT

A method of capturing carbon dioxide ($CO_2$) present in air is provided. The method includes adding a carbon-dioxide-capturing device to a heating, ventilation, and air conditioning (HVAC) system of a building. The carbon-dioxide-capturing device is added to one or both of an air handler and air-distribution ductwork of the HVAC system. The method further includes circulating air including carbon dioxide through the carbon-dioxide-capturing device in the HVAC system. A direct decarbonization system for capturing carbon dioxide present in air is also provided. The system includes an HVAC unit, air-distribution ductwork connected to the HVAC unit, and a carbon-dioxide-capturing device disposed in one or both of the HVAC unit and the air-distribution ductwork. Carbon dioxide gas present in air passing through the HVAC unit or the air-distribution ductwork is removable from the air by the carbon-dioxide-capturing device.

17 Claims, 10 Drawing Sheets

(51) Int. Cl.
     *B01D 53/06*        (2006.01)
     *B01D 53/14*        (2006.01)
     *F24F 8/125*        (2021.01)
     *F24F 8/175*        (2021.01)
     *B01D 53/22*        (2006.01)

(52) U.S. Cl.
     CPC .............. *B01D 53/14* (2013.01); *F24F 8/175* (2021.01); *B01D 53/1475* (2013.01); *B01D 53/229* (2013.01)

(56) References Cited

U.S. PATENT DOCUMENTS

| | | |
|---|---|---|
| 8,157,892 B2 | 4/2012 | Meirav |
| 8,491,858 B2 | 7/2013 | Seeker et al. |
| 9,446,343 B2 | 9/2016 | Elliott et al. |
| 9,643,123 B2 | 5/2017 | Nulwala et al. |
| 12,168,197 B2 * | 12/2024 | Zhong .................... F24F 8/158 |
| 2015/0053366 A1 | 2/2015 | Melsheimer |

\* cited by examiner

MULTI-FUNCTIONAL EQUIPMENT FOR DIRECT DECARBONIZATION WITH IMPROVED INDOOR AIR QUALITY

CROSS-REFERENCE TO RELATED APPLICATIONS

This application claims the benefit of U.S. Provisional Application No. 63/272,351, filed Oct. 27, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method and system of capturing carbon dioxide present in air from buildings and the environment, and other applications.

BACKGROUND OF THE INVENTION

The level of greenhouse gases (primarily water vapor, carbon dioxide, methane, nitrous oxide, and ozone) in the atmosphere is important due to its effect on Earth's average surface temperature. Increased carbon dioxide ($CO_2$) production and emission in the last 300 years has been one of the largest culprits in the rising level of atmospheric greenhouse gases, which threatens to increase the average surface temperature on Earth. A variety of technologies have been utilized for capture of carbon dioxide before it enters the atmosphere, which is generally referred to as point source capture. For example, carbon dioxide can be captured from concentrated flue gas streams at industrial chemical plants and biomass power plants. Despite these efforts, there remains a need to reduce the level of carbon dioxide that is present in ambient air due to daily carbon dioxide emissions from various sources.

Direct air capture (DAC) of carbon dioxide is an alternative to point source capture. Direct air capture involves directly pulling carbon dioxide out of the ambient air/atmosphere and can be useful to reduce atmospheric levels of carbon dioxide gas that cannot be controlled by other means such as point source capture, reduced carbon dioxide generation/emission, and reduced deforestation. Direct air capture is typically accomplished with a DAC system that is implemented in a stand-alone DAC plant. However, two major challenges associated with direct air capture are the high capital equipment costs for DAC plants and the energy costs required to move large volumes of air through a DAC system and to capture and sequester the carbon dioxide in the DAC system.

SUMMARY OF THE INVENTION

A method of capturing carbon dioxide ($CO_2$) present in air is provided. The method includes adding a carbon-dioxide-capturing device to a heating, ventilation, and air conditioning (HVAC) system of a building. The carbon-dioxide-capturing device is added to one or both of an air handler and air-distribution ductwork of the HVAC system. The method further includes circulating air including carbon dioxide through the carbon-dioxide-capturing device in the HVAC system.

In specific embodiments, the air is non-ambient air within the building or the air is ambient air drawn into the HVAC system from an environment outside of the building.

In specific embodiments, the carbon-dioxide-capturing device removes carbon dioxide from the air by one of adsorption and absorption.

In specific embodiments, the carbon-dioxide-capturing device includes one of a hydrophobic material and a hydrophilic material.

In specific embodiments, the carbon-dioxide-capturing device includes one of a thermally conductive material and a thermally non-conductive material.

In specific embodiments, the carbon-dioxide-capturing device includes a carbon-dioxide-capturing material that is regenerated in the HVAC system or is removed from the HVAC system and regenerated outside of the HVAC system.

In particular embodiments, the carbon-dioxide-capturing material is regenerated using waste energy from the HVAC system.

In specific embodiments, the carbon dioxide captured in the HVAC system is decomposed by one or more of a biophotosynthetic process, a photothermal process, a microbial-photoelectrochemical process, a photosynthetic and photocatalytic (PS/PC) process, a photoelectrochemical (PEC) process, and a photovoltaic plus electrochemical (PV+EC) process.

In specific embodiments, the air is actively or passively circulated through the carbon-dioxide-capturing device.

In specific embodiments, the carbon-dioxide-capturing device is either stationary or disposed on a rotating structure.

In specific embodiment, the step of adding a carbon-dioxide-capturing device further includes adding a plurality of carbon-dioxide-capturing devices to the HVAC system, wherein one of the carbon-dioxide-capturing devices removes carbon dioxide from the air while another of the carbon-dioxide-capturing devices is being regenerated.

In specific embodiments, the building is one of a commercial building and a residential building.

In specific embodiments, the carbon-dioxide-capturing device includes a carbon-dioxide-capturing material that comprises one of carbon fibers, zeolites, and other microporous materials.

In specific embodiments, the carbon-dioxide-capturing device includes a carbon-dioxide-capturing material that comprises one of an amine, a carbonate, and an ionic solution.

A direct decarbonization system for capturing carbon dioxide present in air is also provided. The system includes a heating, ventilation, and air conditioning (HVAC) unit. The system further includes air-distribution ductwork connected to the HVAC unit, and a carbon-dioxide-capturing device disposed in one or both of the HVAC unit and the air-distribution ductwork. Carbon dioxide ($CO_2$) gas present in air passing through the HVAC unit or the air-distribution ductwork is removable from the air by the carbon-dioxide-capturing device.

In specific embodiments, the carbon-dioxide-capturing device comprises one of an adsorbent material and an absorbent material.

In specific embodiments, the carbon-dioxide-capturing device comprises one of a hydrophobic and a hydrophilic material.

In specific embodiments, the carbon-dioxide-capturing device comprises one of a thermally conductive material and a thermally non-conductive material.

In specific embodiments, the carbon-dioxide-capturing device comprises a membrane.

In specific embodiments, the carbon-dioxide-capturing device is stationary or attached to a moving structure.

These and other features of the invention will be more fully understood and appreciated by reference to the description of the embodiments and the drawings.

DETAILED DESCRIPTION OF THE CURRENT EMBODIMENTS

As discussed herein, the current embodiments relate to a system and method for capturing carbon dioxide ($CO_2$) present in the air, i.e. direct decarbonization of the air. The current embodiments offer an alternative direct air capture (DAC) process that does not require the construction of a new plant or other facility in which the carbon dioxide capture takes place. Instead, the current embodiments are integrated into the heating, ventilation, and air conditioning (HVAC) systems of commercial and residential buildings. The current embodiments therefore can significantly reduce the capital expenditure costs for DAC by leveraging existing building structures as well as equipment infrastructure of these buildings that is in any event required to be installed. Further, the current embodiments may only increase the HVAC energy budget of the building by 10 to 20% depending on the scale of the operation, which is only a small fraction of the energy cost required to perform conventional DAC of carbon dioxide. As such, the current embodiments provide the dual benefits of maintaining occupancy comfort (heating, cooling, etc.) and performing DAC to improve air quality with only a modest increase over the energy cost of meeting occupancy comfort alone, and at a significantly lower cost than conventional DAC.

Figure 1:
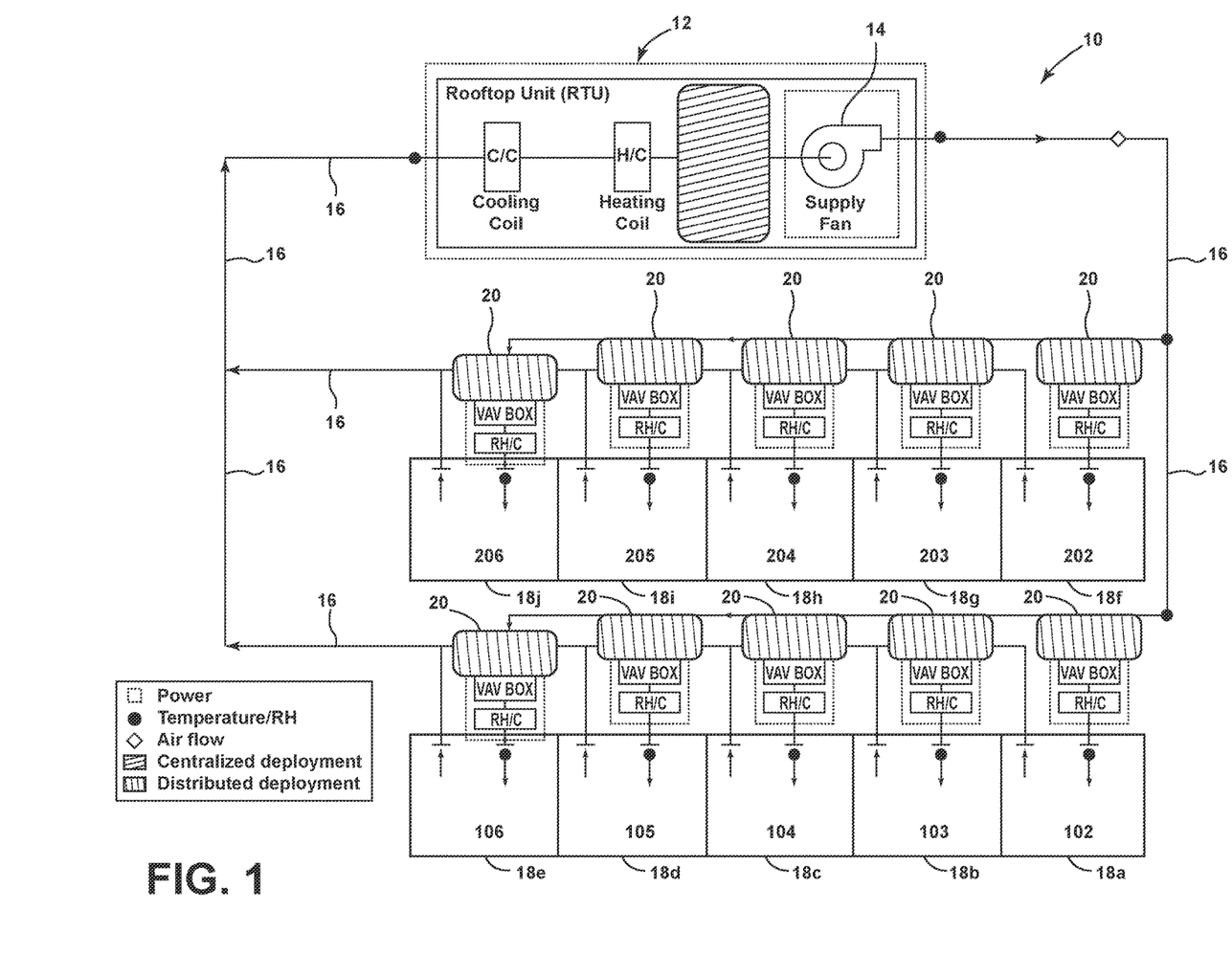
FIG. 1 is a schematic view of a direct decarbonization system for capturing carbon dioxide in accordance with some embodiments of the disclosure.
Figure 2:
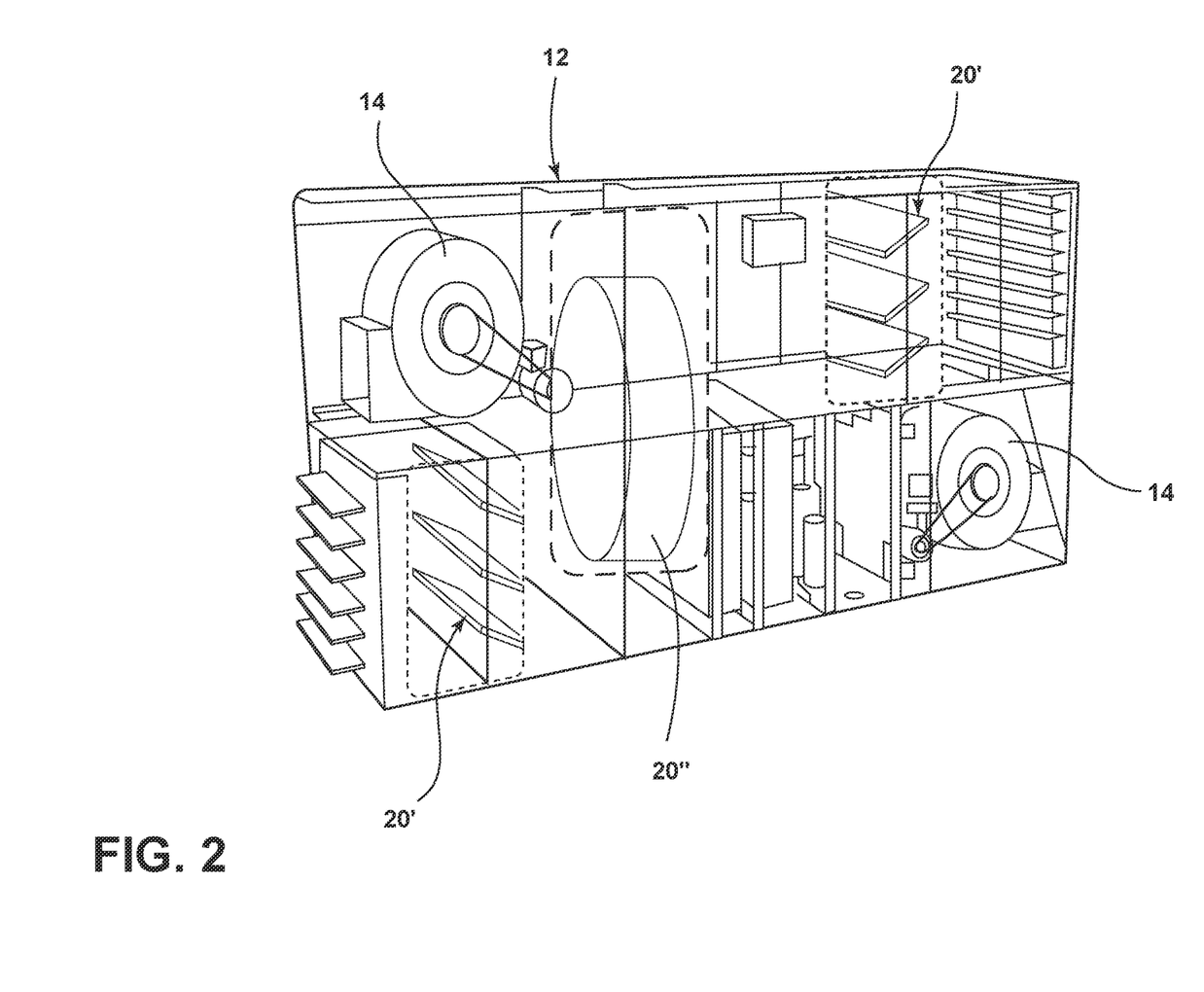
FIG. 2 is a perspective view of an air handler (HVAC unit) of the direct decarbonization system including a carbon-dioxide-capturing device in accordance with some embodiments of the disclosure.

With reference first to FIGS. 1 and 2, a direct decarbonization system 10 for capturing carbon dioxide present in air includes an HVAC unit (air handler, air handing unit) 12 including one or more blowers 14 that move air through the unit. In many instances, the HVAC unit 12 is disposed on the roof of a commercial building (e.g., multi-story office building, warehouse, storage unit, hotel, etc.) or residential building (e.g., apartment complex) as a rooftop unit. Alternatively, for example in the case of smaller commercial and residential structures (e.g., single story office buildings, condominiums, single family homes), the HVAC unit may be disposed on the ground level and may be entirely outside the building or partially within the building. The HVAC unit 12 provides typical treatment of air within the building including heating and cooling of the air.

Air-distribution ductwork 16 is connected to the HVAC unit 12. The ductwork 16 provides a network of passages that allow for fluid communication between the HVAC unit 12 and various rooms 18 (i.e. room 18a, room 18b, room 18c, . . . ) of the building. In the example shown in FIG. 1, rooms 18a-e correspond to room numbers 102-106 on a first floor of the building structure, and rooms 18f-j correspond to room numbers 202-206 on a second floor of the building structure that is above the first floor. However, it should be understood that building may have only one floor, or may have any other number of floors. The ductwork 16 includes passages that deliver air from the HVAC unit 12 to the rooms 18 of the building, and return air passages that take air from the rooms back to the HVAC unit in a closed loop. Operation of the blower(s) 14 draws air through the HVAC unit 12 and distributes treated air to the rooms 18 via the ductwork 16, and simultaneously sucks air through the return air passages of the ductwork back to the HVAC unit. The HVAC unit 12 and accompanying ductwork 16 together comprise an HVAC system.

A carbon-dioxide-capturing device 20 is disposed in the HVAC unit 12, the air-distribution ductwork 16, or both. Disposition of the carbon-dioxide-capturing device 20 in the HVAC unit 12 provides for a centralized deployment of carbon capture, i.e. the carbon capture is centralized in the HVAC unit of the building. Disposition of the carbon-dioxide-capturing device 20 in the ductwork 16 provides for a distributed deployment of carbon capture, i.e. the carbon capture is distributed throughout the building. For example, a carbon-dioxide-capturing device 20 may be positioned in the ductwork at locations proximate and associated with some or all of the rooms 18 on each floor of the building. Alternatively or in addition, a carbon-dioxide-capturing device 20 may be located at an end of the ductwork on each floor, or may be located only in certain zones of the building. Furthermore, the carbon-dioxide-capturing device 20 may be retrofitted/added to an existing HVAC system (including the HVAC unit 12 and ductwork 16), such as, for example, by replacing an existing HVAC unit with a new HVAC unit including the carbon-dioxide-capturing device 20 and/or by adding carbon-dioxide-capturing devices 20 to the building's ductwork 16. Alternatively, in the case of new building construction, the carbon-dioxide-capturing device(s) 20 may be included in the HVAC system that is installed during construction of the building. The carbon-dioxide-capturing device(s) 20 is adapted to and capable of removing (capturing) carbon dioxide gas from a stream of air, such that the concentration of carbon dioxide that exits the carbon-dioxide-capturing device(s) is 0-90% of the concentration entering the device(s). For example, the entering concentration of carbon dioxide may be 410 ppm, but it should be understood that the concentration may be greater than 410 ppm based on environmental factors and the type of building.

The carbon-dioxide-capturing devices 20' may be stationary. For example, these carbon-dioxide-capturing devices may include fixed filters. Alternatively or in addition, some or all of the carbon-dioxide-capturing devices 20″ may move during operation. For example, these carbon-dioxide-capturing devices may be disposed on a rotating structure such as a rotating wheel that turns the carbon-dioxide-capturing devices. In the case of a rotating wheel, a portion of the carbon-dioxide-capture device 20″ may be adsorbing carbon dioxide while the other portion is being regenerated, as described in more detail below. Furthermore, the carbon-dioxide-capturing devices(s) 20′, 20″ may be disposed upstream of the blowers 14, downstream of the blowers, or both.

Figure 3:
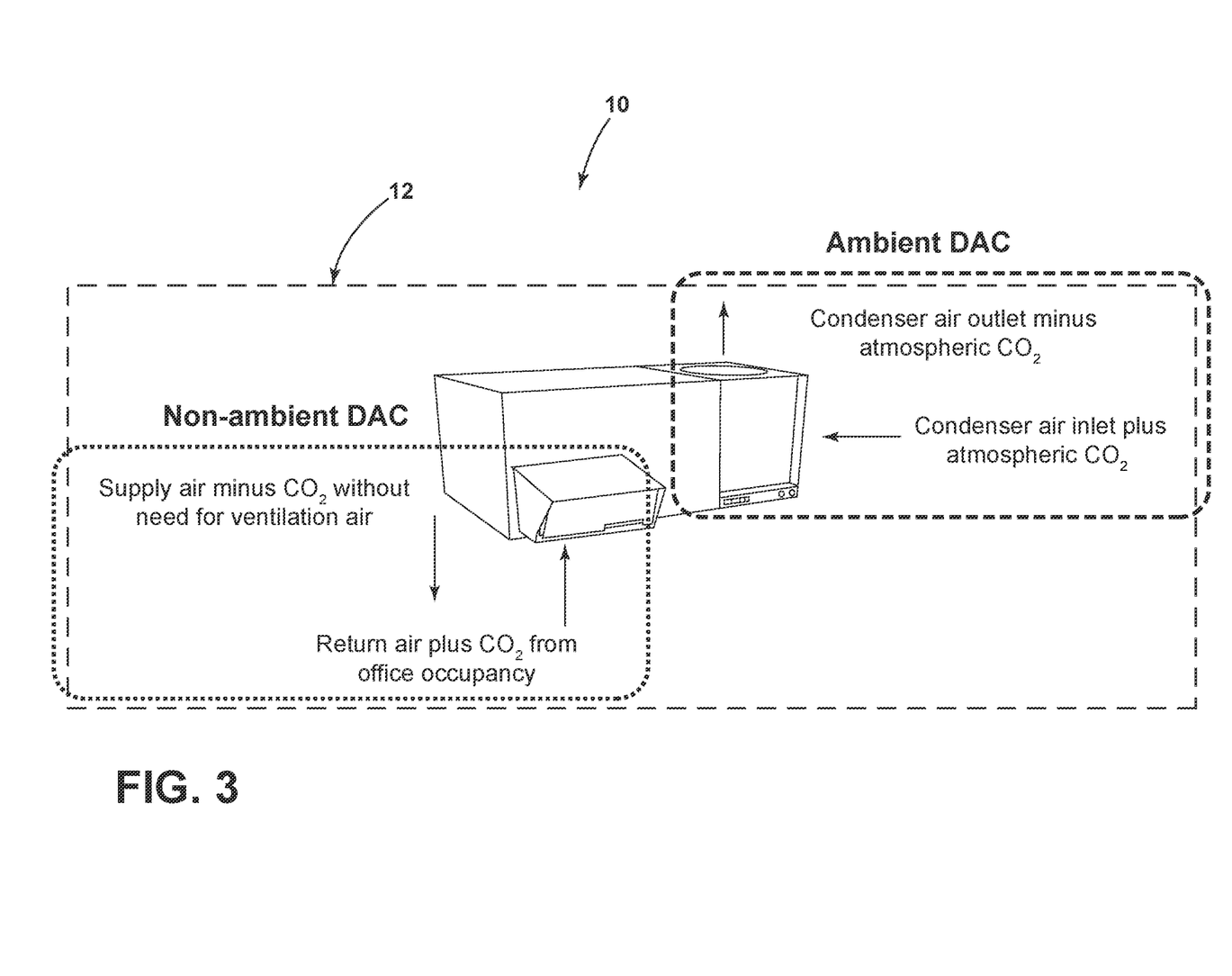
FIG. 3 is a schematic view of the air handler.

Turning to FIGS. 1 and 3, the direct decarbonization system 10 may process one or both of ambient air and/or non-ambient. In this context, ambient air refers to air in the outside environment, i.e. that is found outside of an enclosed space of a building, whereas non-ambient air refers to the air that is found within an enclosed space of a building. The non-ambient air may have a higher concentration of carbon dioxide, due to the exhale of carbon dioxide from the occupants of the building or from other processes occurring in the building. In the case of direct air capture of ambient air, the blower(s) 14 of the system 10 draws in ambient air from the outside environment. The ambient air includes carbon dioxide gas. This ambient air drawn into the HVAC unit 12 is moved through the carbon-dioxide-capturing device(s) 20 to remove carbon dioxide from the ambient air. After carbon dioxide removal, this air may enter the building, may be subjected to additional processes (such as VOC removal, humidification, dehumidification, disinfecting, etc.), or may be returned to the outside environment. On the other hand, in the case of direct air capture of non-ambient air, the non-ambient air may be return air brought back to the HVAC unit 12 from the internal space of the building through the ductwork 16, may be air that enters into the building directly via an open door or window, or may be exhaust air from building processes. The non-ambient air is drawn into the HVAC unit 12 is moved through the carbon-dioxide-capturing device(s) 20 to remove carbon dioxide from the non-ambient air. After carbon dioxide removal, this air may be used as supply air for the HVAC unit 12, i.e. this air is further processed (e.g., heated, cooled, humidified, dehumidified, subjected to VOC removal, disinfected, etc.) in the HVAC unit 12 and sent back to the internal space of the building, or may be "rejected" and exhausted to the outside atmosphere. In an alternative embodiment, instead of being actively circulated by the air handler 14, the non-ambient air may be passively circulated through the carbon-dioxide-capturing device(s) 20 by a natural draft such as via a density variation caused by a temperature or concentration differential, or other convective forces.

The capture of carbon dioxide in the system 10 via the carbon-dioxide-capturing device(s) 20 may be conducted by adsorption (i.e., using a solid material carbon-dioxide-capturing device) or by absorption (i.e., using a liquid material carbon-dioxide-capturing device). The carbon-dioxide-capturing device(s) 20 therefore may be one or more of the carbon-dioxide-capturing devices discussed hereinbelow. In some embodiments, a carbon-dioxide-capturing device of the system 10 is an activated carbon fiber material coated on a high surface area substrate material. For example, the carbon-dioxide-capturing material of the device 20 may be low-cost carbon fibers such as those produced from a low-cost regenerable source, such as lignin, and fibers bonded with carbonized resin may be packed in 3D forms that are useful for air filtration. The carbon fibers may be adjusted during formation of the carbon-dioxide-capturing material to be hydrophobic or hydrophilic, depending on the desired properties. For example, in the case of hydrophobic carbons, the carbon-dioxide-capturing material is useful for VOC removal in addition to carbon dioxide removal, whereas in the case of hydrophilic carbons, the carbon-dioxide-capturing material is useful for dehumidification in addition to carbon dioxide removal. In certain embodiments, the carbon-dioxide-capturing material is a standalone structure that is a fiber, fabric, or solid structure.

In other embodiments, in addition to carbon fibers, the solid media carbon-dioxide-capturing materials may include zeolites and other microporous materials having a surface texture that is suitable for adsorbing carbon dioxide from an air stream. The solid carbon-dioxide-capturing materials may be attached to a support or layered on a substrate material of varying thicknesses. The support structure may have a complex geometry, and the support structure or substrate material may be formed of a metal (e.g. aluminum, copper, steel, alloys), a polymer or polymer composite (e.g. PLA, Nylon, Teflon with additives), or a ceramic (e.g. alumina, SiC). Further, the substrate material may be thermally conductive or non-conductive, and may be in the form of a regular mesh or irregular foam. Furthermore, the substrate material may be formed by additive manufacturing. The solid carbon-dioxide-capturing device may have a monolithic construction with structured channels, or may have a modular construction with individual modules that each have a flat channel, corrugated, or wavy structure.

Figure 4:
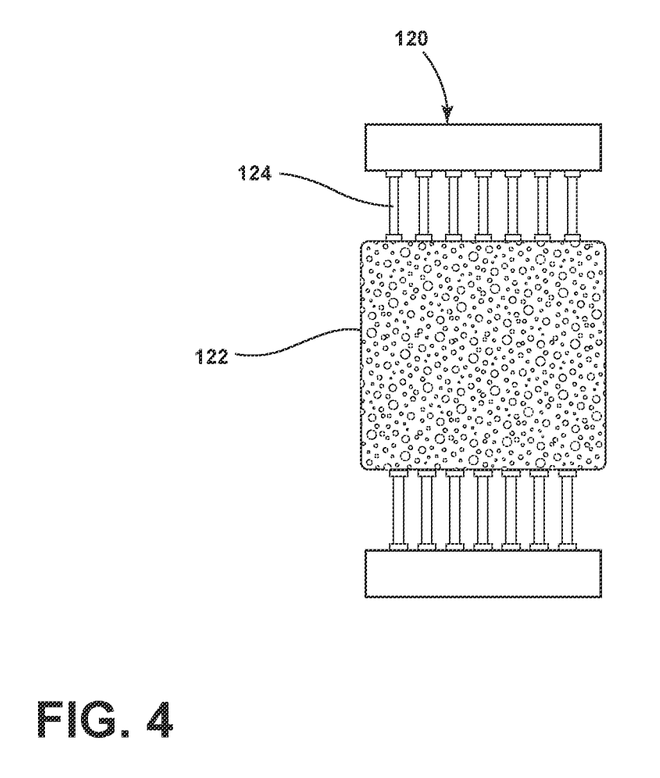
FIG. 4 is a schematic view of a carbon-dioxide-capturing device of the direct decarbonization system in accordance with some embodiments of the disclosure.

In some embodiments, the solid carbon-dioxide-capturing materials may be regenerated at an external source, or alternatively may be regenerated internally in the system 10 cyclically. More specifically, the adsorption of carbon dioxide by the carbon-dioxide-capturing device 20 results in the generation of heat (i.e., it is an exothermic process). Further, once the solid carbon-dioxide-capturing material of the carbon-dioxide-capturing device 20 becomes nearly or fully adsorbed with carbon dioxide, the carbon-dioxide-capturing material must be regenerated by removing the carbon dioxide from the material for storage (e.g., underground storage) or for conversion into other compounds (see below). If the carbon-dioxide-capturing materials are removable and replaceable, the carbon-dioxide-capturing materials may be removed from the carbon-dioxide-capturing device 20 and transported to another location for regeneration and/or processing of the trapped carbon dioxide. Alternatively, the carbon-dioxide-capturing material may be left in the carbon-dioxide-capturing device 20 and regenerated such as by using the heat of adsorption to remove the trapped carbon dioxide and collect it for further processing. For example, as shown in FIG. 4, the carbon-dioxide-capturing device 120 may include a porous, solid carbon-dioxide-capturing material 122 and a plurality of thermal channels 124 for heat transfer, particularly for removing the heat of adsorption derived from adsorbing carbon dioxide, and conversely for later utilizing the heat of adsorption to regenerate the carbon-dioxide-capturing material. Alternatively, the solid carbon-dioxide-capturing material may be regenerated using waste heat from another process, or heat generated by a separate heater. In yet other embodiments, the solid carbon-dioxide-capturing materials can be regenerated using electric current or any other suitable external stimuli to release the captured carbon dioxide for storage and/or conversion.

In some embodiments, a carbon-dioxide-capturing device of the system 10 alternatively may be a liquid absorption device that captures carbon dioxide utilizing a liquid that absorbs the carbon dioxide gas from the air. The liquid used for carbon dioxide capture may be, for example, but not limited to, amines, carbonates, and ionic solutions capable of capturing carbon dioxide. The flow of air through the liquid-based carbon-dioxide-capturing device may be parallel flow, counter flow, cross flow, or a mixed flow. The absorption liquid or liquid solution may be sprayed in an empty housing through which air is passed, or may be sprayed onto a structure (contactor) on which the absorption takes place. The contactor may have one of a variety of configurations such as a regular mesh, an irregular foam, or a complex geometry. The contactor may be thermally conductive or non-conductive. The contactor may be formed of a metal (e.g. aluminum, copper, steel, alloys), a polymer or polymer composite (e.g. PLA, Nylon, Teflon with additives), or a ceramic (e.g. alumina, SiC), and the contactor may be formed by additive manufacturing.

Figure 5:
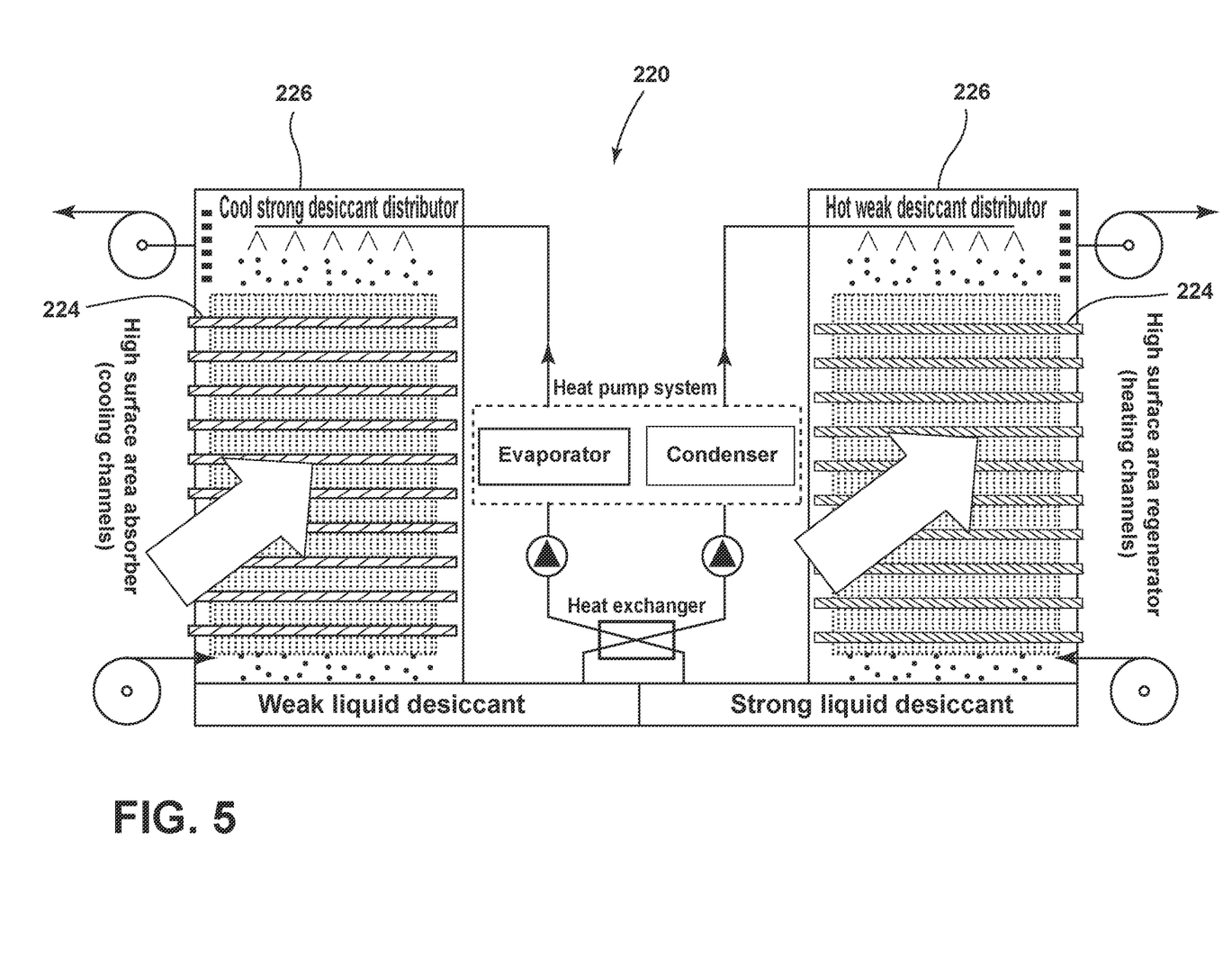
FIG. 5 is a perspective view of a carbon-dioxide-capturing device of the system in accordance with other embodiments of the disclosure.

Turning to FIG. 5, in certain embodiments the liquid-based carbon-dioxide-capturing device 220 may include two units 226 that operate in a modular manner in which one of the units is absorbing while the other is regenerating, and the heat of absorption from the unit that is absorbing is transferred to the other unit that is regenerating. A shown by example, heat transfer channels 224 in the left-hand-side unit 226 provide cooling by drawing away the heat of absorption, while the heat transfer channels 224 in the right-hand-side unit 226 provide heat to this unit in order to regenerate the carbon-dioxide-capturing material. In other embodiments, the liquid-based carbon-dioxide-capturing device may be regenerated using waste heat from another process, or heat generated by a separate heater. In yet other embodiments, the liquid-based carbon-dioxide-capturing device can be regenerated using pressure, solar energy, or any other suitable external stimuli to release the captured carbon dioxide for storage and/or conversion.

Figure 6:
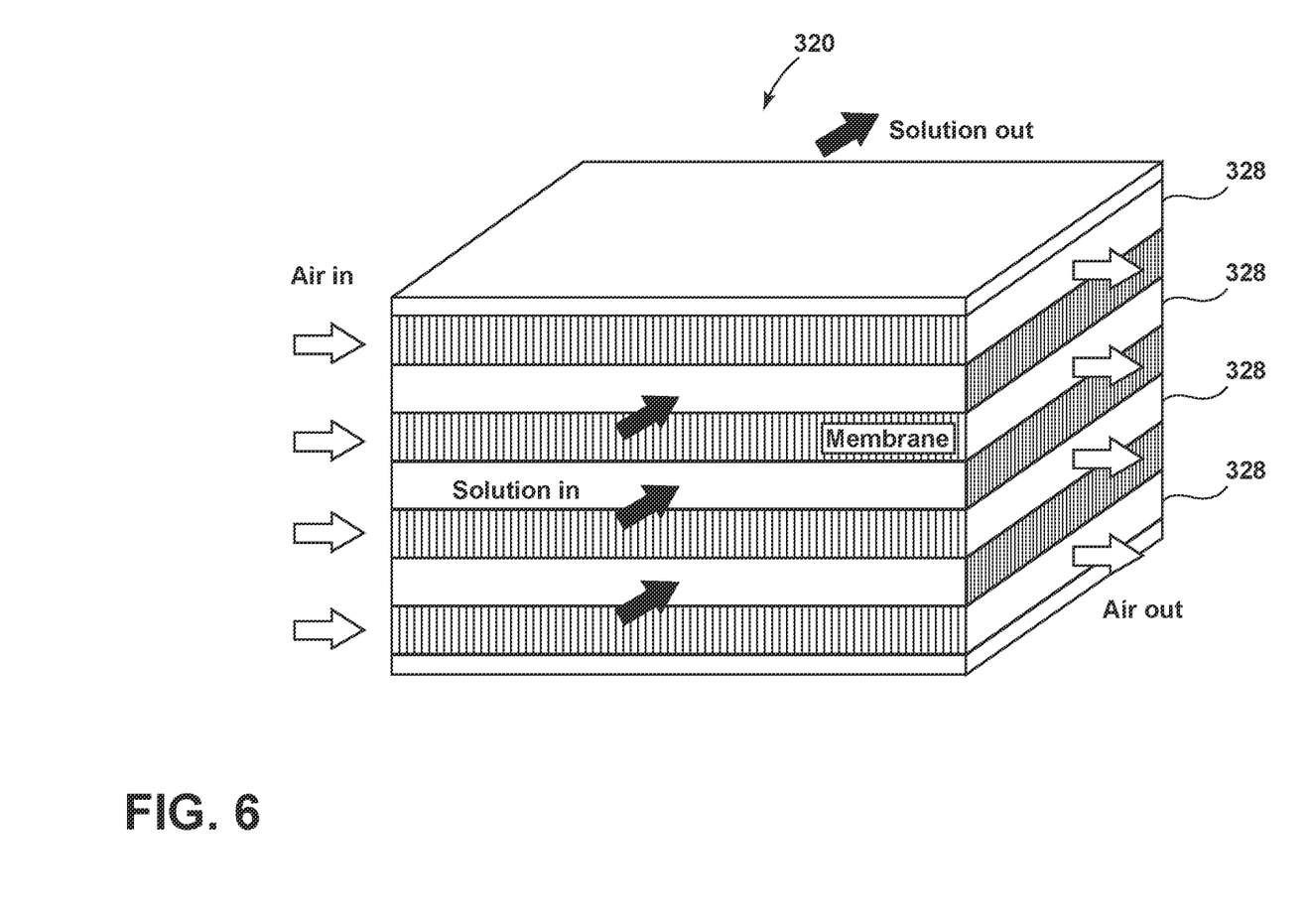
FIG. 6 is a schematic view of a carbon-dioxide-capturing device of the system in accordance with other embodiments of the disclosure.
Figure 7A:
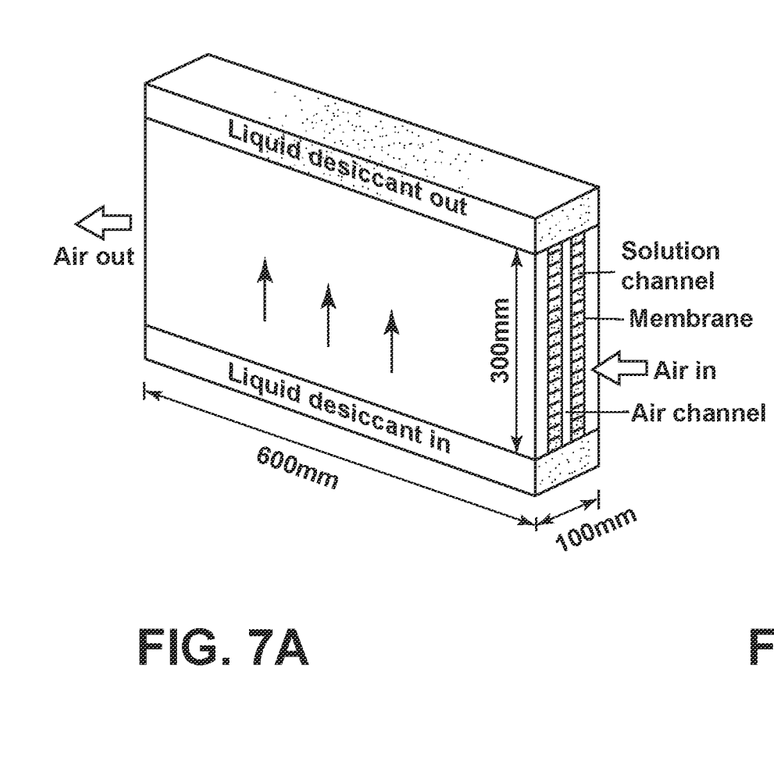
FIGS. 7A and 7B are schematic views of a carbon-dioxide-capturing device of the system in accordance with other embodiments of the disclosure.
Figure 7B:
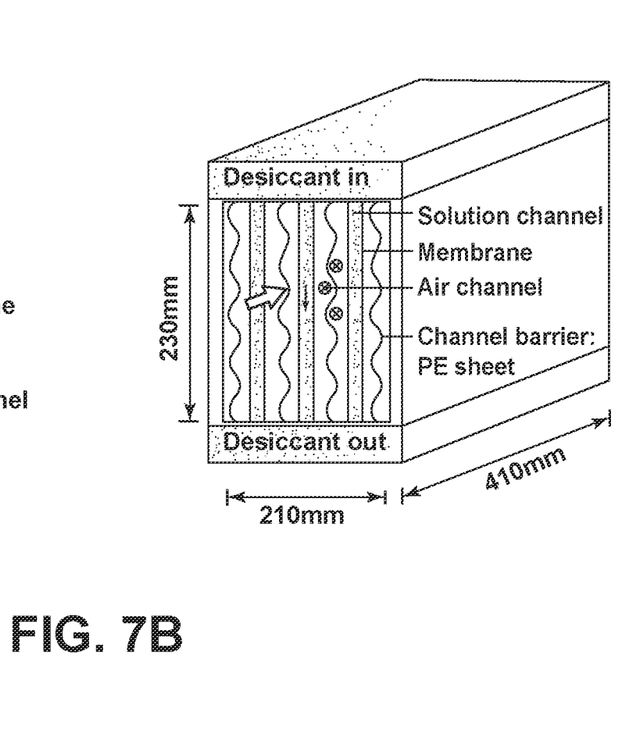

Turning to FIG. 6, in other certain embodiments the liquid-based carbon-dioxide-capturing device 320 may include a membrane or plurality of staked membranes 328. Both air containing carbon dioxide and a carbon-dioxide-absorbing liquid solution are passed through the membranes 328, and the liquid solution absorbs carbon dioxide during contact in the membranes. The flow of air and absorbing liquid by be parallel, counter, cross, or mixed flow. The shape of the membrane channels may be regular or irregular, and the shape of the membrane may be a complex geometry. The material forming the membrane may be thermally conductive or non-conductive, the membrane may be formed of a metal (e.g. aluminum, copper, steel, alloys), a polymer or polymer composite (e.g. PLA, Nylon, Teflon with additives), or a ceramic (e.g. alumina, SiC), and the membrane may be formed by additive manufacturing. As shown in FIG. 7A, the contact of air and liquid through the liquid may be direct. Alternatively, as shown in FIG. 7B, the contact may be indirect in which the air flows through channels.

Figure 8A:
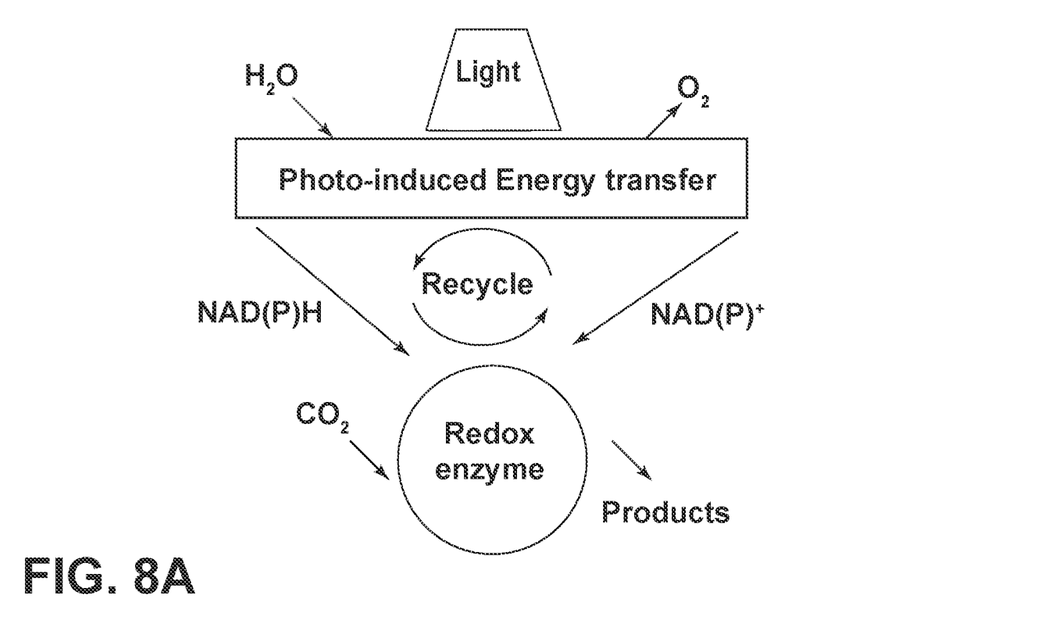
FIGS. 8A-F are schematic views of carbon dioxide conversion methods for converting the carbon dioxide captured by the carbon-dioxide-capturing device into other compounds.
Figure 8B:
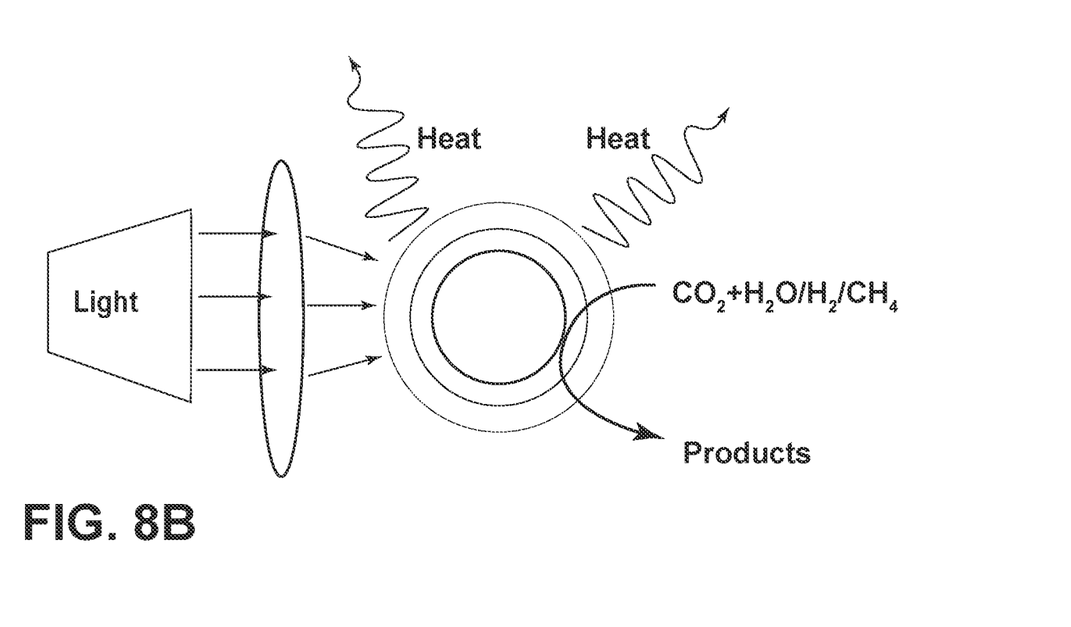
Figure 8C:
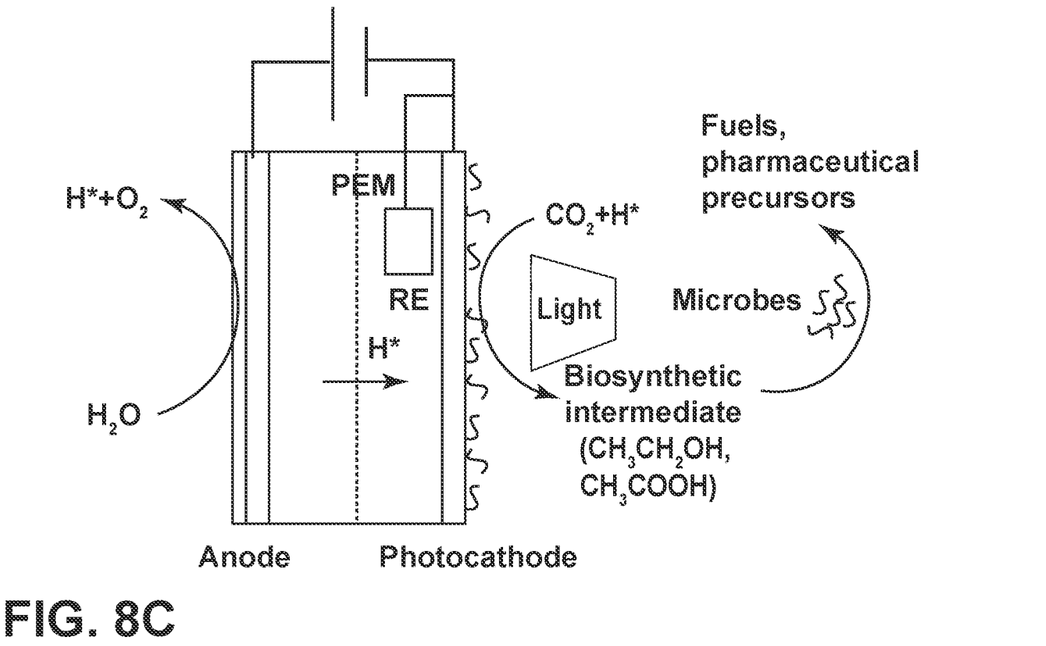
Figure 8D:
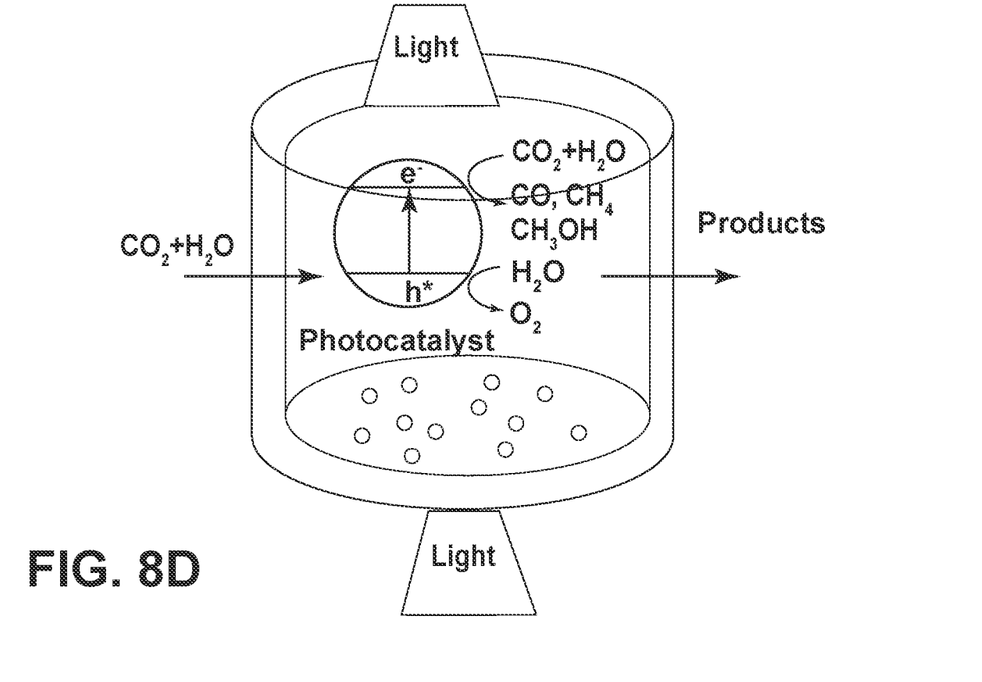
Figure 8E:
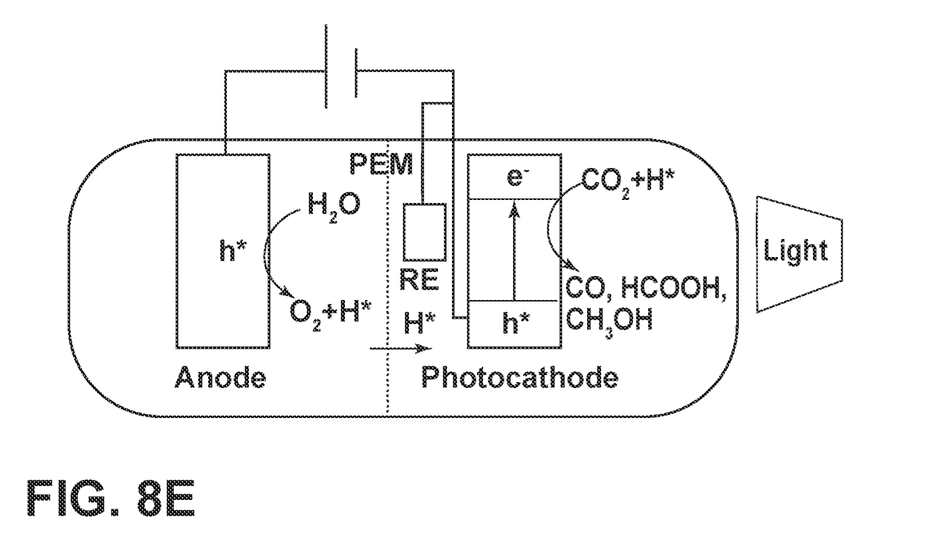
Figure 8F:
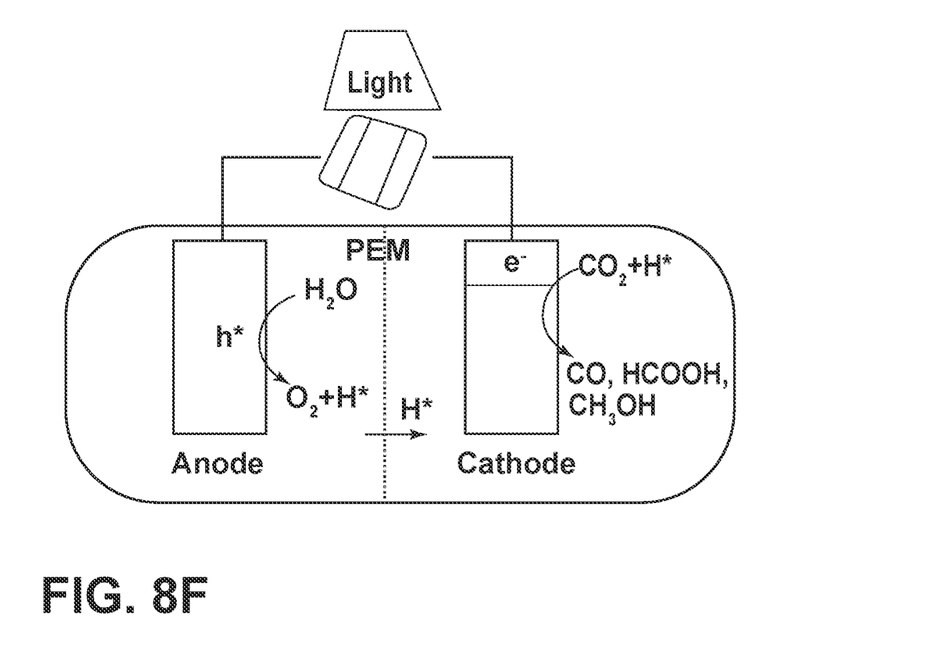

Turning to FIGS. 8A-F, the carbon dioxide that is captured and recovered from the carbon-dioxide-capturing device(s) 20 of the system 10 may be subsequently converted to useful products and/or other byproducts by a variety of methods. The conversion of carbon dioxide may be performed in conjunction with the regeneration of the carbon-dioxide-capturing device(s) 20, or may be performed at a later time and/or other location after regeneration of the device(s) 20 using the carbon dioxide captured by the device(s) 20. FIG. 8A illustrates a biophotosynthetic carbon dioxide conversion process, FIG. 8B illustrates a photothermal carbon dioxide conversion process, FIG. 8C illustrates a microbial-photoelectrochemical carbon dioxide conversion process, FIG. 8D illustrates a photosynthetic and photocatalytic (PS/PC) carbon dioxide conversion process, FIG. 8E illustrates a photoelectrochemical (PEC) carbon dioxide conversion process, and FIG. 8F illustrates a photovoltaic plus electrochemical (PV+EC) carbon dioxide conversion process.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of capturing carbon dioxide ($CO_2$) present in air, the method comprising:
    adding a carbon-dioxide-capturing device to a heating, ventilation, and air conditioning (HVAC) system of a building; and
    circulating air including carbon dioxide through the carbon-dioxide-capturing device in the HVAC system;
    wherein the carbon-dioxide-capturing device is added to one or both of an air handler and air-distribution ductwork of the HVAC system;
    wherein the carbon-dioxide-capturing device removes carbon dioxide from the air by absorption.

2. The method of claim 1, wherein the air is non-ambient air within the building or the air is ambient air drawn into the HVAC system from an environment outside of the building.

3. The method of claim 1, wherein the carbon-dioxide-capturing device includes one of a hydrophobic material and a hydrophilic material.

4. The method of claim 1, wherein the carbon-dioxide-capturing device includes one of a thermally conductive material and a thermally non-conductive material.

5. The method of claim 1, wherein the carbon-dioxide-capturing device includes a carbon-dioxide-capturing material that is regenerated in the HVAC system or is removed from the HVAC system and regenerated outside of the HVAC system.

6. The method of claim 5, wherein the carbon-dioxide-capturing material is regenerated using waste energy from the HVAC system.

7. The method of claim 1, wherein the carbon dioxide captured in the HVAC system is decomposed by one or more of a biophotosynthetic process, a photothermal process, a microbial-photoelectrochemical process, a photosynthetic and photocatalytic (PS/PC) process, a photoelectrochemical (PEC) process, and a photovoltaic plus electrochemical (PV+EC) process.

8. The method of claim 1, wherein the air is actively or passively circulated through the carbon-dioxide-capturing device.

9. The method of claim 1, wherein the step of adding a carbon-dioxide-capturing device further includes adding a plurality of carbon-dioxide-capturing devices to the HVAC system, wherein one of the carbon-dioxide-capturing devices removes carbon dioxide from the air while another of the carbon-dioxide-capturing devices is being regenerated.

10. The method of claim 1, wherein the building is one of a commercial building and a residential building.

11. The method of claim 1, wherein the carbon-dioxide-capturing device includes a carbon-dioxide-capturing material that comprises one of an amine, a carbonate, and an ionic solution.

12. A method of capturing carbon dioxide ($CO_2$) present in air, the method comprising:
    adding a carbon-dioxide-capturing device to a heating, ventilation, and air conditioning (HVAC) system of a building; and
    circulating air including carbon dioxide through the carbon-dioxide-capturing device in the HVAC system;
    wherein the carbon-dioxide-capturing device is added to one or both of an air handler and air-distribution ductwork of the HVAC system;
    wherein the carbon-dioxide-capturing device is stationary.

13. A direct decarbonization system for capturing carbon dioxide present in air, the system comprising:
    a heating, ventilation, and air conditioning (HVAC) unit;
    air-distribution ductwork connected to the HVAC unit; and
    a carbon-dioxide-capturing device disposed in one or both of the HVAC unit and the air-distribution ductwork;
    wherein carbon dioxide ($CO_2$) gas present in air passing through the HVAC unit or the air-distribution ductwork is removable from the air by the carbon-dioxide-capturing device;
    wherein the carbon-dioxide-capturing device comprises an absorbent material.

14. The direct decarbonization system of claim 13, wherein the carbon-dioxide-capturing device comprises one of a hydrophobic and a hydrophilic material.

15. The direct decarbonization system of claim 13, wherein the carbon-dioxide-capturing device comprises one of a thermally conductive material and a thermally non-conductive material.

16. The direct decarbonization system of claim 13, wherein the carbon-dioxide-capturing device comprises a membrane.

17. A direct decarbonization system for capturing carbon dioxide present in air, the system comprising:
    a heating, ventilation, and air conditioning (HVAC) unit;
    air-distribution ductwork connected to the HVAC unit; and
    a carbon-dioxide-capturing device disposed in one or both of the HVAC unit and the air-distribution ductwork;
    wherein carbon dioxide ($CO_2$) gas present in air passing through the HVAC unit or the air-distribution ductwork is removable from the air by the carbon-dioxide-capturing device;
    wherein the carbon-dioxide-capturing device is stationary.

* * * * *